(12) United States Patent
Nakajima et al.

(10) Patent No.: US 10,753,632 B2
(45) Date of Patent: Aug. 25, 2020

(54) AIR-CONDITIONING SYSTEM

(71) Applicant: Mitsubishi Electric Corporation, Chiyoda-ku (JP)

(72) Inventors: Osamu Nakajima, Chiyoda-ku (JP); Mio Motodani, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 18 days.

(21) Appl. No.: 16/074,829

(22) PCT Filed: Nov. 22, 2016

(86) PCT No.: PCT/JP2016/084611
§ 371 (c)(1),
(2) Date: Aug. 2, 2018

(87) PCT Pub. No.: WO2017/145465
PCT Pub. Date: Aug. 31, 2017

(65) Prior Publication Data
US 2019/0063774 A1   Feb. 28, 2019

(30) Foreign Application Priority Data

Feb. 25, 2016 (JP) ................................ 2016-034634

(51) Int. Cl.
*G05D 23/00* (2006.01)
*G05B 15/00* (2006.01)
(Continued)

(52) U.S. Cl.
CPC .............. *F24F 11/46* (2018.01); *F24F 11/52* (2018.01); *F24F 11/54* (2018.01); *F24F 11/56* (2018.01);
(Continued)

(58) Field of Classification Search
CPC ........ F24F 11/46; F24F 11/64–65; F24F 11/89; F24F 11/56; F24F 11/52; F24F 11/54; F24F 2110/10; F24E 2140/60; F24E 2140/50
(Continued)

(56) References Cited

U.S. PATENT DOCUMENTS

| 5,372,015 A | 12/1994 | Suzuki et al. |
| 2011/0126206 A1* | 5/2011 | Kato ........................ G06F 1/206 718/103 |

(Continued)

FOREIGN PATENT DOCUMENTS

| JP | 5-10568 A | 1/1993 |
| JP | 7-225038 A | 8/1995 |

(Continued)

OTHER PUBLICATIONS

International Search Report dated Feb. 14, 2017, in PCT/JP2016/084611, filed Nov. 22, 2016.

*Primary Examiner* — Md Azad
(74) *Attorney, Agent, or Firm* — Oblon, McClelland, Maier & Neustadt, L.L.P.

(57) ABSTRACT

An air-conditioning system includes: a controller configured to: extract a lower limit load that occurs at a minimum, in a load that occurs in an air-conditioned space and that changes depending a time period; distribute a proportion at which the extracted lower limit load is to be processed, as a processing proportion stored in a memory; control each of air-conditioning apparatuses that are at a second place and subsequent places in apparatus rankings, such that the lower limit load is processed and distributed, and to control an air-conditioning apparatus that is at a first place in the apparatus rankings, (Continued)

such that a remaining load of the lower limit load and a fluctuating load that occurs over the lower limit load are processed.

10 Claims, 11 Drawing Sheets

(51) Int. Cl.
| | |
|---|---|
| *G05B 13/00* | (2006.01) |
| *G01M 1/38* | (2006.01) |
| *F24F 11/46* | (2018.01) |
| *F24F 11/54* | (2018.01) |
| *F24F 11/89* | (2018.01) |
| *F24F 11/64* | (2018.01) |
| *F24F 11/65* | (2018.01) |
| *F24F 11/56* | (2018.01) |
| *F24F 11/52* | (2018.01) |
| *G05B 13/04* | (2006.01) |
| *F24F 140/50* | (2018.01) |
| *F24F 140/60* | (2018.01) |
| *F24F 110/10* | (2018.01) |

(52) U.S. Cl.
CPC ............. *F24F 11/64* (2018.01); *F24F 11/65* (2018.01); *F24F 11/89* (2018.01); *G05B 13/048* (2013.01); *F24F 2110/10* (2018.01); *F24F 2140/50* (2018.01); *F24F 2140/60* (2018.01)

(58) Field of Classification Search
USPC ........................................................ 700/278
See application file for complete search history.

(56) References Cited

U.S. PATENT DOCUMENTS

| | | | |
|---|---|---|---|
| 2011/0257794 A1 | 10/2011 | Nishino et al. | |
| 2012/0097360 A1* | 4/2012 | Ohba | ........................ H05K 7/20 165/11.1 |
| 2015/0051741 A1* | 2/2015 | Bruck | ........................ F24F 11/46 700/276 |
| 2016/0161136 A1* | 6/2016 | Macek | ................ G05B 13/048 700/276 |
| 2016/0201934 A1* | 7/2016 | Hester | ........................ F24F 11/30 700/276 |
| 2018/0172309 A1* | 6/2018 | Niikura | ................... F24F 11/89 |

FOREIGN PATENT DOCUMENTS

| | | |
|---|---|---|
| JP | 2004-239519 A | 8/2004 |
| JP | 2010-156494 A | 7/2010 |

* cited by examiner

AIR-CONDITIONING SYSTEM

TECHNICAL FIELD

The present invention relates to an air-conditioning system that controls operation of a plurality of air-conditioning apparatuses.

BACKGROUND ART

In an existing air-conditioning system that includes a plurality of air-conditioning apparatuses, each air-conditioning apparatus individually operates such that its own control target value is achieved, and normally, the air-conditioning apparatuses do not cooperate with each other. Here, the plurality of air-conditioning apparatuses include, for example, a direct expansion type air-conditioning apparatus and a floor cooling and heating apparatus using hot water and cold water. As described above, each of the direct expansion type air-conditioning apparatus and the floor cooling and heating apparatus included in the air-conditioning system operates such that the room temperature measured by each air-conditioning apparatus approaches a target temperature set by a user. Thus, the proportion of the load borne by each air-conditioning apparatus in the entire load required in an air-conditioned space is uncertain. Here, in the case of achieving the same temperature in the same environment, power consumption of the entire air-conditioning system varies depending on the proportion of the load borne by each air-conditioning apparatus. Patent Literature 1 discloses an air-conditioning system that creates an operation plan for a plurality of air-conditioning apparatuses such that power saving is achieved and in which the plurality of air-conditioning apparatuses operate according to the created operation plan. In Patent Literature 1, an operation plan that minimizes or maximizes an objective function is created on the basis of mathematical programming.

CITATION LIST

Patent Literature

Patent Literature 1: Japanese Unexamined Patent Application Publication No. 2004-239519

SUMMARY OF INVENTION

Technical Problem

However, in the air-conditioning system disclosed in Patent Literature 1, operation of the plurality of air-conditioning apparatuses depends on the method for determining the objective function, and thus intention of a user of an air-conditioned space is not reflected.

The present invention has been made to solve the above-described problem, and provides an air-conditioning system in which intention of a user of an air-conditioned space is reflected.

Solution to Problem

An air-conditioning system according an embodiment of the present invention includes: a plurality of air-conditioning apparatuses configured to condition air in an air-conditioned space; a storage unit configured to store an apparatus rankings created for the plurality of air-conditioning apparatuses in order of a shorter time taken to reach a set temperature, and a processing proportion of a load to be processed by each of the air-conditioning apparatuses that are at a second place and subsequent places in the apparatus rankings; and a controller configured to control operation of the plurality of air-conditioning apparatuses. The controller includes: an extraction unit configured to extract a lower limit load that occurs at a minimum, in a load that occurs in the air-conditioned space and that changes depending a time period; a distribution unit configured to distribute a proportion at which the lower limit load extracted by the extraction unit is to be processed, as the processing proportion stored in the storage unit; and an air-conditioning control unit configured to control each of the air-conditioning apparatuses that are at the second place and subsequent places in the apparatus rankings, such that the lower limit load is processed at the processing proportion distributed by the distribution unit, and to control the air-conditioning apparatus that is at a first place in the apparatus rankings, such that a remaining load of the lower limit load and a fluctuating load that occurs over the lower limit load are processed.

Advantageous Effects of Invention

According to the embodiment of the present invention, the proportion at which the lower limit load extracted by the extraction unit is to be processed is distributed as the processing proportion stored in the storage unit. Here, the user of the air-conditioned space is allowed to store a desired processing proportion in the storage unit in advance. Therefore, an air-conditioning system in which intention of the user of the air-conditioned space is reflected is realized.

DESCRIPTION OF EMBODIMENTS

Embodiment 1

Figure 1:
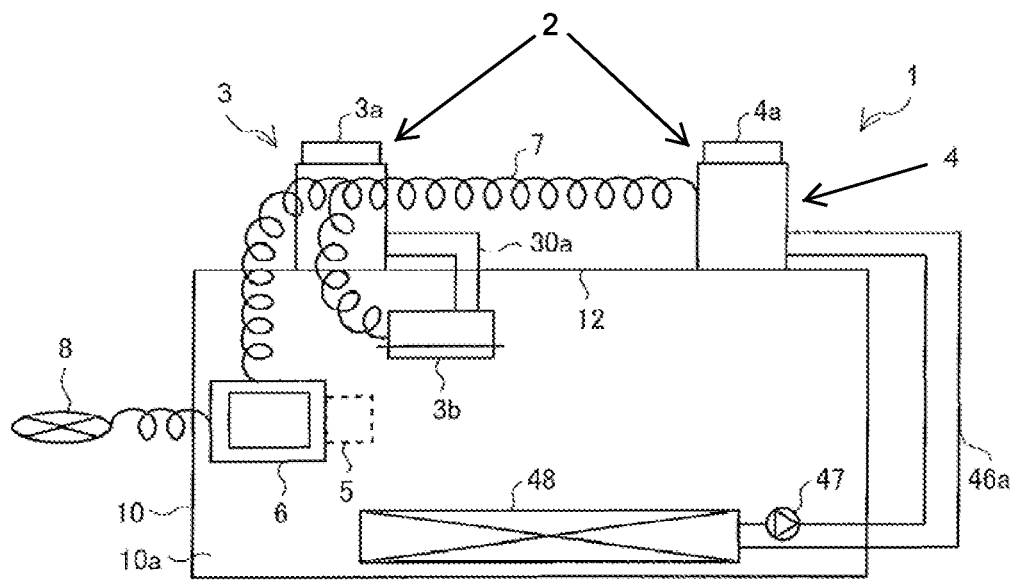
FIG. 1 is a schematic diagram showing an air-conditioning system 1 according to Embodiment 1 of the present invention.

Hereinafter, Embodiments of the air-conditioning system according to the present invention will be described with reference to the drawings. FIG. 1 is a schematic diagram showing an air-conditioning system 1 according to Embodiment 1 of the present invention. The air-conditioning system 1 will be described with reference to FIG. 1. As shown in FIG. 1, the air-conditioning system 1 includes a plurality of air-conditioning apparatuses 2, a storage unit 5, and a controller 6. The plurality of air-conditioning apparatuses 2 include, for example, a first air-conditioning apparatus 3 that is a direct expansion type air-conditioning apparatus, and a second air-conditioning apparatus 4 that is a floor cooling and heating apparatus. The first air-conditioning apparatus 3, the second air-conditioning apparatus 4, and the controller 6 are connected to each other by a transmission line 7 dedicated for air-conditioning apparatuses. The controller 6 is connected to the internet 8 and controls operation of the first air-conditioning apparatus 3 and the second air-conditioning apparatus 4 via the transmission line 7.

(First Air-Conditioning Apparatus 3)

Figure 2:
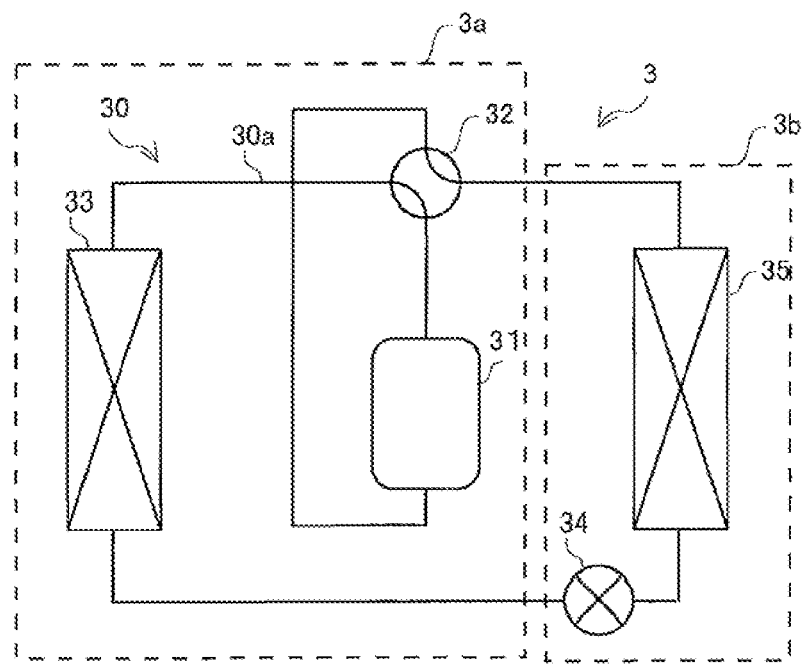
FIG. 2 is a circuit diagram showing a first air-conditioning apparatus 3 in Embodiment 1 of the present invention.

FIG. 2 is a circuit diagram showing the first air-conditioning apparatus 3 in Embodiment 1 of the present invention. As shown in FIG. 2, the first air-conditioning apparatus 3 includes a first outdoor unit 3a and an indoor unit 3b. The first outdoor unit 3a is installed outside an air-conditioned space 10a and includes a first compressor 31, a first flow path switching unit 32, and a first outdoor heat exchanger 33. The indoor unit 3b is installed at a ceiling 12 inside the air-conditioned space 10a and includes a first expansion unit 34 and an indoor heat exchanger 35. In addition, in the indoor unit 3b, an air inlet (not shown) through which indoor air in the air-conditioned space 10a is sucked is provided in a lower surface thereof, and an air outlet (not shown) through which air is blown out to the air-conditioned space 10a is provided around the air inlet. Here, the first compressor 31, the first flow path switching unit 32, the first outdoor heat exchanger 33, the first expansion unit 34, and the indoor heat exchanger 35 are connected to each other by a first refrigerant pipe 30a to form a first refrigerant circuit 30 in which refrigerant flows.

The first compressor 31 compresses the refrigerant. The first flow path switching unit 32 switches the direction in which the refrigerant flows in the first refrigerant circuit 30. The first flow path switching unit 32 switches whether the refrigerant discharged from the first compressor 31 flows to the first outdoor heat exchanger 33 or to the indoor heat exchanger 35, and any of cooling operation and heating operation is performed accordingly. The first outdoor heat exchanger 33 exchanges heat between the refrigerant and outdoor air, for example. The first expansion unit 34 expands the refrigerant and reduces the pressure of the refrigerant, and is, for example, an electromagnetic expansion valve whose opening degree is adjusted. The indoor heat exchanger 35 exchanges heat between the refrigerant and the indoor air in the air-conditioned space 10a.

(Second Air-Conditioning Apparatus 4)

Figure 3:
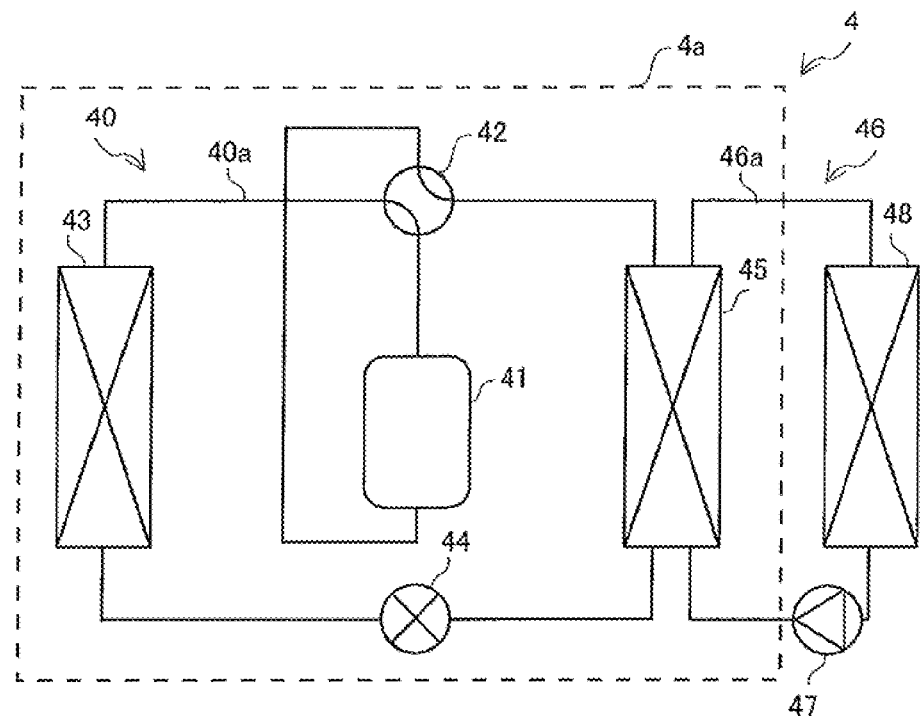
FIG. 3 is a circuit diagram showing a second air-conditioning apparatus 4 in Embodiment 1 of the present invention.

FIG. 3 is a circuit diagram showing the second air-conditioning apparatus 4 in Embodiment 1 of the present invention. As shown in FIG. 3, the second air-conditioning apparatus 4 includes a second outdoor unit 4a, a pump 47, and an underfloor heat exchanger 48. The second outdoor unit 4a is installed outside the air-conditioned space 10a and includes a second compressor 41, a second flow path switching unit 42, a second outdoor heat exchanger 43, a second expansion unit 44, and a water-refrigerant heat exchanger 45. The pump 47 and the underfloor heat exchanger 48 are installed under a floor 14 inside the air-conditioned space 10a. Here, the second compressor 41, the second flow path switching unit 42, the second outdoor heat exchanger 43, the second expansion unit 44, and the water-refrigerant heat exchanger 45 are connected to each other by a second refrigerant pipe 40a to form a second refrigerant circuit 40 in which refrigerant flows. In addition, the pump 47, the water-refrigerant heat exchanger 45, and the underfloor heat exchanger 48 are connected to each other by a water pipe 46a to form a water circuit 46 in which water flows. A heat medium flowing in the water circuit 46 is not limited to water and may be brine or other media.

The second compressor 41 compresses the refrigerant. The second flow path switching unit 42 switches the direction in which the refrigerant flows in the second refrigerant circuit 40. The second flow path switching unit 42 switches whether the refrigerant discharged from the second compressor 41 flows to the second outdoor heat exchanger 43 or the water-refrigerant heat exchanger 45. Accordingly, any of cooling operation and heating operation is performed. The second outdoor heat exchanger 43 exchanges heat between the refrigerant and outdoor air, for example. The second expansion unit 44 expands the refrigerant and reduces the pressure of the refrigerant, and is, for example, an electromagnetic expansion valve whose opening degree is adjusted. The water-refrigerant heat exchanger 45 exchanges heat between the refrigerant and the water flowing through the water pipe 46a. The pump 47 circulates the water flowing through the water pipe 46a. The underfloor heat exchanger 48 exchanges heat between the indoor air in the air-conditioned space 10a and the water.

Figure 4:
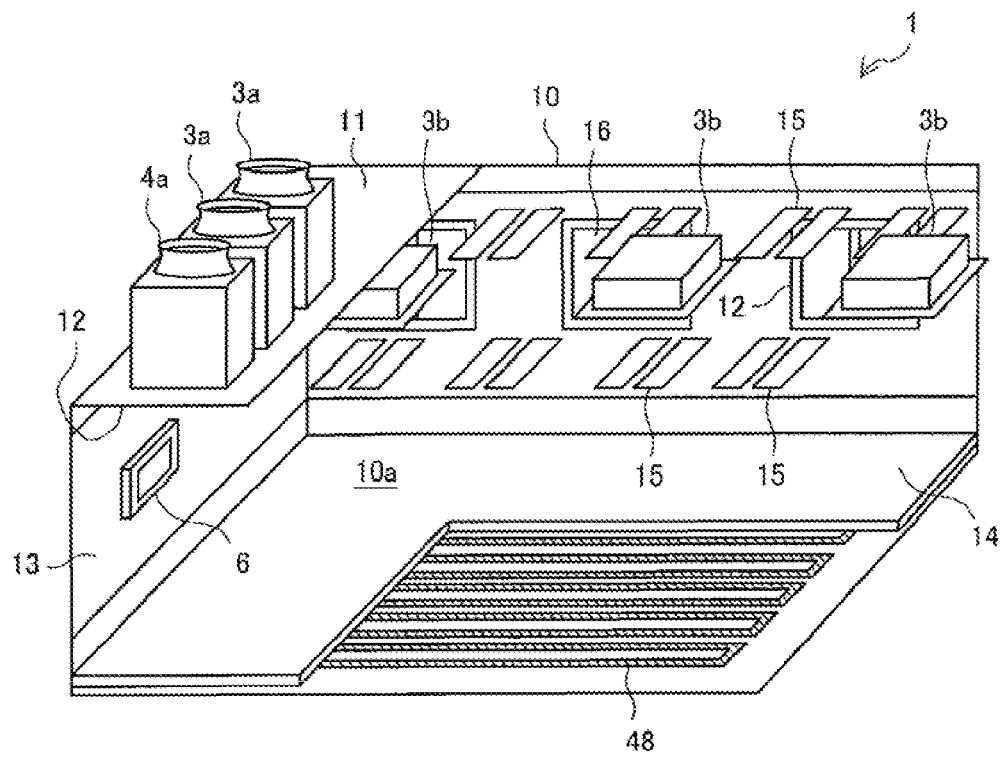
FIG. 4 is a perspective view showing the air-conditioning system 1 according to Embodiment 1 of the present invention.

FIG. 4 is a perspective view showing the air-conditioning system 1 according to Embodiment 1 of the present invention. As shown in FIG. 4, the first outdoor unit 3a and the second outdoor unit 4a are installed on a roof floor 11 of a building 10 having the air-conditioned space 10a. In Embodiment 1, the case where two first outdoor units 3a are installed is shown as an example. However, the number of first outdoor units 3a may be one or more than two. The indoor unit 3b is installed at the ceiling 12 in the air-conditioned space 10a. In Embodiment 1, the case where three indoor units 3b are installed is shown. However, the number of first outdoor units 3a may be one, two, or more than 3. Lighting 15 for illuminating the air-conditioned space 10a is further installed at the ceiling 12. Each indoor unit 3b may be embedded in the ceiling 12 or may be suspended from the ceiling 12. In addition, each indoor unit 3b may be installed at a wall 13 of the air-conditioned space 10a near the ceiling 12. In this case, the air inlet is provided in the upper surface of the indoor unit 3b, and the air outlet is provided in the lower surface of the indoor unit 3b. Furthermore, each indoor unit 3b may be installed in a space above the ceiling. In this case, a ceiling air inlet and a ceiling air outlet are provided in the ceiling 12, and the air in the space above the ceiling and the air in the air-conditioned space 10a flow through the ceiling air inlet and the ceiling air outlet therebetween. The ceiling air inlet is provided near the lighting 15. Accordingly, when the air in the air-conditioned space 10a is sucked into the space above the ceiling through the ceiling air inlet, the air is sucked together with heat generated by the lighting 15. Thus, it is possible to inhibit heat generated by the lighting 15 from being released to the air-conditioned space 10a.

The underfloor heat exchanger 48 is installed under the floor 14 in the air-conditioned space 10a. Windows 16 that are freely opened or closed by the user of the air-conditioned space 10a are provided in the wall 13 of the air-conditioned space 10a. In addition, the controller 6 is mounted on the wall 13 of the air-conditioned space 10a. In Embodiment 1, the air-conditioned space 10a is an office space, and, for example, fixtures such as office desks, chairs, shelves, and whiteboards, office automation equipment such as personal computers and printers, and dividers and walls for dividing the air-conditioned space 10a are provided in the air-conditioned space 10a as appropriate.

(Storage Unit 5)

Figure 5:
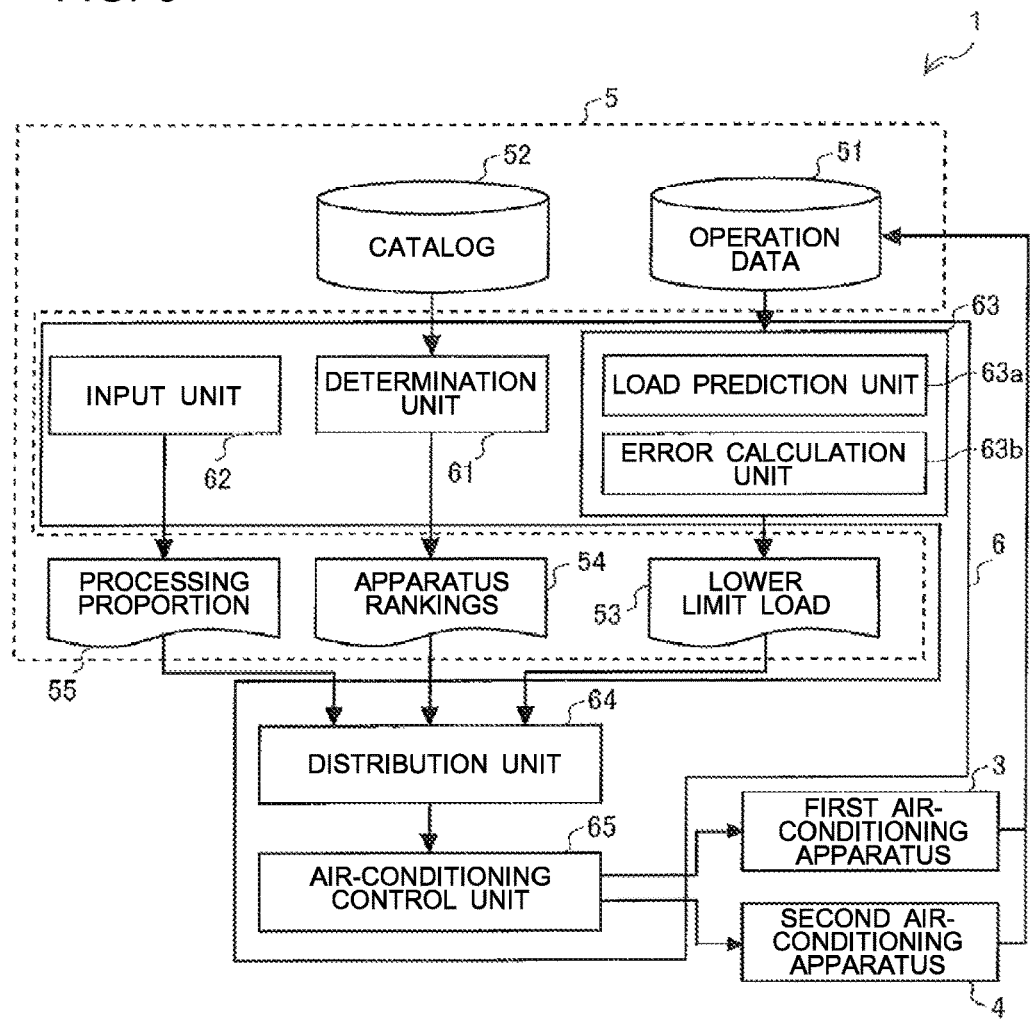
FIG. 5 is a block diagram showing a controller 6 in Embodiment 1 of the present invention.

FIG. 5 is a block diagram showing the controller 6 in Embodiment 1 of the present invention. Next, the storage unit 5 and the controller 6 will be described. As shown in FIG. 5, the storage unit 5 stores operation data 51, a catalog 52, a lower limit load 53, apparatus rankings 54, and a processing proportion 55.

(Operation Data 51)

The operation data 51 is an operation status collected by the controller 6 from the first air-conditioning apparatus 3 and the second air-conditioning apparatus 4. The operation data 51 includes, for example, information from which it is possible to directly or indirectly acquire the amount of heat supplied by the first air-conditioning apparatus 3 and the second air-conditioning apparatus 4 to the air-conditioned space 10a, and information about air quality such as the air temperature and the air humidity of the air-conditioned space 10a. The amount of heat supplied by the first air-conditioning apparatus 3 is estimated, for example, by using a pre-stored characteristic expression for the first compressor 31 on time-sequentially acquired data of the pressure of the refrigerant at the suction side of the first compressor 31, which is provided in the first outdoor unit 3a, the pressure of the refrigerant at the discharge side of the first compressor 31, and the rotation speed of the first compressor 31.

The amount of heat supplied by the second air-conditioning apparatus 4 is estimated, for example, by using a pre-stored characteristic expression for the second compressor 41 on time-sequentially acquired data of the pressure of the refrigerant at the suction side of the second compressor 41, which is provided in the second outdoor unit 4a, the pressure of the refrigerant at the discharge side of the second compressor 41, and the rotation speed of the second compressor 41. In addition, the amount of heat supplied by the indoor unit 3b of the first heat exchanger to the air-conditioned space 10a is estimated, for example, by using a pre-stored characteristic expression for the indoor heat exchanger 35 on the basis of the rotation speed of a fan (not shown) provided to the indoor unit 3b and the temperature of the refrigerant flowing into the indoor unit 3b. Moreover, the operation data 51 may include information about weather such as the outdoor temperature and the amount of solar radiation when the first air-conditioning apparatus 3 and the second air-conditioning apparatus 4 are operating, and information about the operation status in the air-conditioned space 10a such as the number of persons present in the air-conditioned space 10a, the operation status of a computing device such as a personal computer, and the operation statuses of the lighting 15.

(Catalog 52)

Figure 6:
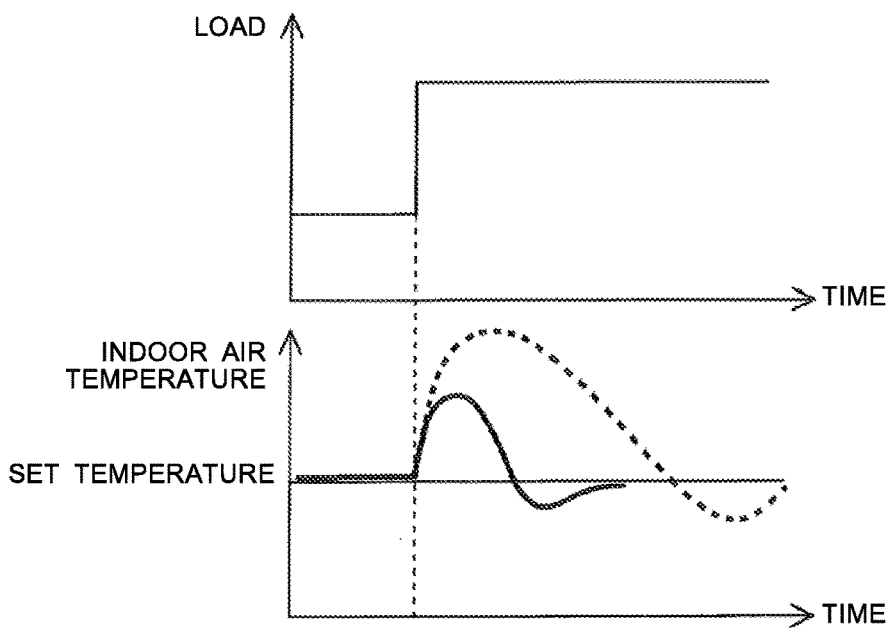
FIG. 6 shows graphs showing controllability of an air-conditioning apparatus 2 in Embodiment 1 of the present invention.

FIG. 6 shows graphs showing controllability of the air-conditioning apparatus 2 in Embodiment 1 of the present invention. Next, the catalog 52 will be described. The catalog 52 indicates the characteristics of the respective air-conditioning apparatuses 2. In particular, the controllability of the respective air-conditioning apparatus 2 is quantitatively described in the catalog 52. The upper part of FIG. 6 is a graph showing the relationship between time and load, and the lower part of FIG. 6 is a graph showing the relationship between time and the temperature of the air in the air-conditioned space 10a and indicates that the temperature of the air maintained at a set temperature changes in response to fluctuation of the load. When the air is conditioned by the single air-conditioning apparatus 2, a time taken until the temperature of the air is returned to the set temperature by following fluctuation of the load is different for each air-conditioning apparatus 2.

As shown in the upper part of FIG. 6, for controllability, followability of the air-conditioning apparatus 2 to reach the set temperature when the load of the air-conditioned space 10a changes stepwise is used as an index. As shown in the lower part of FIG. 6, the air-conditioning apparatus 2 having good controllability (a solid line) has a short time taken to reach the set temperature after the load changes, as compared to the air-conditioning apparatus 2 having poor controllability (a broken line). The catalog 52 is created in advance by a test conducted for the controllability of each air-conditioning apparatus 2 in an environmental test lab in which it is possible to change, for example, the temperature and the humidity of the air and the load as appropriate.

(Lower Limit Load 53)

Figure 7:
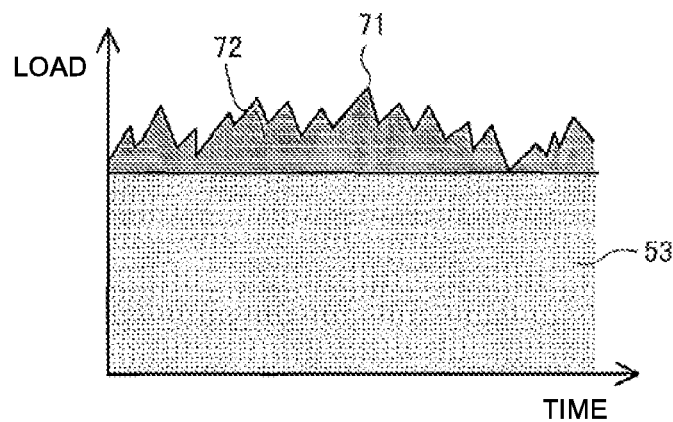
FIG. 7 is a graph showing load in Embodiment 1 of the present invention.

FIG. 7 is a graph indicating load in Embodiment 1 of the present invention. As shown in FIG. 7, the lower limit load 53 is a load that occurs at a minimum, in a load that occurs in the air-conditioned space 10a and that changes depending on a time period. A load obtained by adding, to the lower limit load 53, a fluctuating load 72 that occurs over the lower limit load 53 is a whole load 71 that occurs in the air-conditioned space 10a.

(Apparatus Rankings 54)

The apparatus rankings 54 are rankings in which the plurality of air-conditioning apparatuses 2 are ranked in the order of better controllability. The apparatus rankings 54 are created with reference to the catalog 52 in the order of a shorter time taken to reach the set temperature, for example. The load to be processed by the air-conditioning apparatus 2 changes when the set temperature changes. Thus, the apparatus rankings 54 may be created in the order of a shorter time taken until the temperature of the air reaches the set temperature when the set temperature is changed. In Embodiment 1, the first air-conditioning apparatus 3 is at the first place, and the second air-conditioning apparatus 4 is at the second place.

(Processing Proportion 55)

The processing proportion 55 is the proportion of the load to be processed by each of the air-conditioning apparatuses 2 that are at the second place and subsequent places in the apparatus rankings 54. Specifically, the processing proportion 55 is the proportion at which each of the air-conditioning apparatuses 2 that are at the second place and subsequent places in the apparatus rankings 54 processes the lower limit load 53. Here, when the proportion at which each of the air-conditioning apparatuses 2 that are at the second place and subsequent places in the apparatus rankings 54 processes the lower limit load 53 is determined, a proportion obtained by subtracting the total proportion is determined as the proportion at which the air-conditioning apparatus 2 that is at the first place in the apparatus rankings 54 processes the lower limit load 53. The processing proportion 55 may include the proportion at which the air-conditioning apparatus 2 that is at the first place in the apparatus rankings 54 processes the lower limit load 53. In this case, the sum of the processing proportions 55 for the respective air-conditioning apparatuses 2 is 100%. The processing proportion 55 for the air-conditioning apparatus 2 that is at the first place in the apparatus rankings 54 is less than 100%. This is because, when the processing proportion 55 for the air-conditioning apparatus 2 that is at the first place in the apparatus rankings 54 is 100%, the processing proportion 55 for each of the air-conditioning apparatuses 2 that are at the second place and subsequent places in the apparatus rankings 54 is 0% and the whole load is to be processed by the air-conditioning apparatus 2 that is at the first place in the apparatus rankings 54.

The storage unit 5 may be included in the controller 6. In addition, the storage unit 5 may be included in a personal computer, a server, or another device that is capable of communicating with the controller 6. Furthermore, in Embodiment 1, the storage unit 5 is described as a shared single storage device as an example, but may be a plurality of storage devices. In this case, the operation data 51, the catalog 52, the lower limit load 53, the apparatus rankings 54, and the processing proportion 55 may be stored in the respective storage devices.

(Controller 6)

The controller 6 is connected to the internet 8 as described above, and transmits and receives information to and from an external server as necessary. As shown in FIG. 5, the controller 6 includes a determination unit 61, an input unit 62, an extraction unit 63, a distribution unit 64, and an air-conditioning control unit 65.

(Determination Unit 61)

The determination unit 61 refers to the catalog 52, determines how good the controllability of the corresponding air-conditioning apparatus 2 is, and creates the apparatus rankings 54. The determination unit 61 may be included in a personal computer, a server, or another device that is capable of communicating with the controller 6.

(Input Unit 62)

Figure 8:
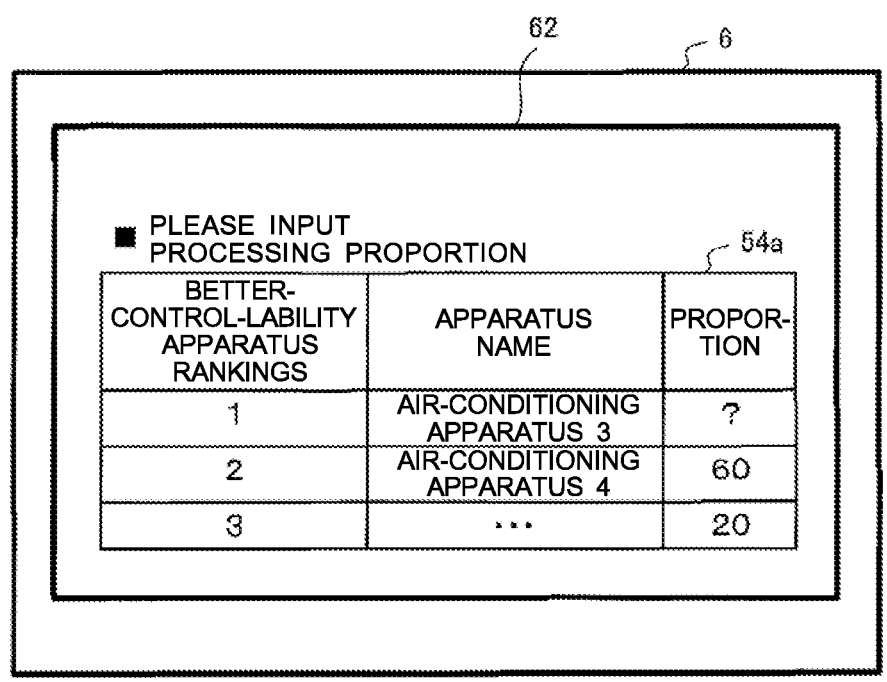
FIG. 8 is a schematic diagram showing the controller 6 in Embodiment 1 of the present invention.

FIG. 8 is a schematic diagram showing the controller 6 in Embodiment 1 of the present invention. The input unit 62 inputs the processing proportion 55 of the load to be processed by each of the air-conditioning apparatuses 2 that are at the second place and subsequent places in the apparatus rankings 54. As shown in FIG. 8, the input unit 62 is provided in the controller 6, and is a touch panel, for example. The user designates, for example, the name 54a of each air-conditioning apparatus 2 in accordance with an instruction on the screen by using the input unit 62. For example, a text such as "Please input a processing proportion" is displayed on the screen of the input unit 62. Then, when the name 54a of each air-conditioning apparatus 2 and the processing proportion 55 are input, the controller 6 stores the processing proportion 55 input with the input unit 62, in the storage unit 5. The input unit 62 may be provided so as to be separate from the controller 6. The input unit 62 may be included in, for example, a server or another device. In this case, the user designates, for example, the name of each air-conditioning apparatus 2 to the controller 6 via the internet 8 by using the input unit 62 included in the server.

(Extraction Unit 63)

The extraction unit 63 extracts the lower limit load 53 and includes a load prediction unit 63a and an error calculation unit 63b.

(Load Prediction Unit 63a)

Figure 9:
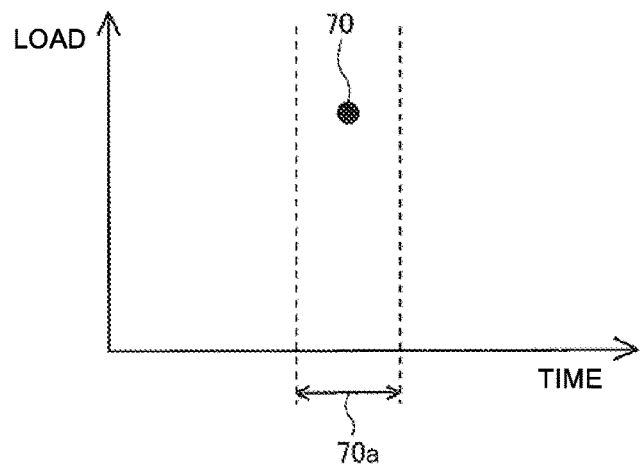
FIG. 9 is a graph showing a predicted load 70 in Embodiment 1 of the present invention.

FIG. 9 is a graph showing a load 70 predicted in Embodiment 1 of the present invention. The load prediction unit 63a predicts a load that will occur in the air-conditioned space 10a, on the basis of the operation data 51 and an air-conditioning situation that can occur in a control period. The load prediction unit 63a predicts a load, for example, by matching the operation data 51 and weather forecast information in a control period. In this case, the load prediction unit 63a refers to weather information or other information from the operation data 51. Where the horizontal axis represents time and the vertical axis represents load in FIG. 9, the load 70 predicted by the load prediction unit 63a is plotted in a target time period 70a as shown in FIG. 9. The load prediction unit 63a may predict a load for each of items such as an amount of heat obtained from the wall 13, an amount of heat obtained from a glass surface of the window 16, an amount of heat generated by a person, and an amount of heat generated by electrical equipment, on the basis of information influencing change of thermal load demand tendency, for example, fluctuation patterns of weather such as the outdoor temperature and the amount of solar radiation, and the fluctuation pattern of the number of persons present in the air-conditioned space 10a. In this case, an air-conditioning thermal load model for the building 10 is created, and a thermal load is calculated by using the air-conditioning thermal load.

(Error Calculation Unit 63b)

Figure 10:
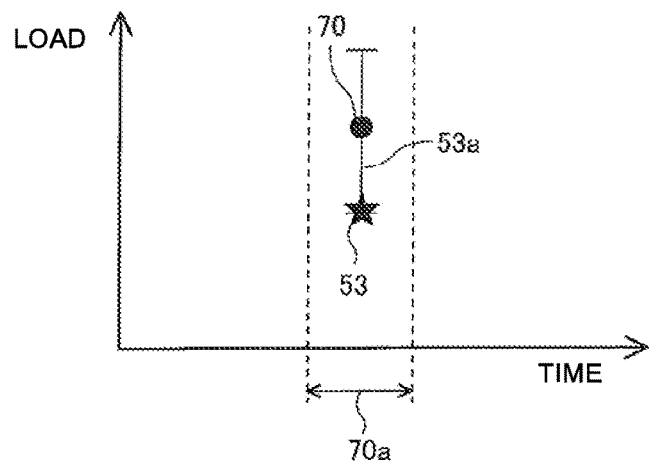
FIG. 10 is a graph showing a lower limit load 53 in Embodiment 1 of the present invention.

FIG. 10 is a graph showing the lower limit load 53 in Embodiment 1 of the present invention. The error calculation unit 63b calculates the lower limit of errors occurring in a load that occurs in the air-conditioned space 10a, and calculates the lower limit load 53. Here, the load that occurs in the air-conditioned space 10a is a load predicted by the load prediction unit 63a. The error calculation unit 63b calculates an error by using a method of error analysis, for example.

When a predicted value of the load that can occur in the control period is denoted by Qpredict and the load in the control period calculated from the operation data 51 in reality is denoted by Qreal, deviation $\Delta Q = Qpredict - Qreal$. Here, when the deviation $\Delta Q$ is calculated in various cases, the average value of a population of the deviation $\Delta Q$ and the variance of the population, that is, unbiased estimate of population variance, are calculated. Then, an error of the deviation $\Delta Q$ is estimated by multiplying the t distribution of Student determined in accordance with the number of samples of the deviation $\Delta Q$, by the unbiased estimate of population variance. As described above, the error calculation unit 63b calculates variations from the predicted load and estimates an upper limit load and the lower limit load 53. Where the horizontal axis represents time and the vertical axis represents load in FIG. 10, an error bar 53a indicating the error value calculated by the error calculation unit 63b is plotted with the predicted load 70 as a starting point as shown in FIG. 10. Here, the lower end of the error bar 53a is the lower limit load 53. As described above, the error calculation unit 63b statically obtains an error from the thermal load predicted on the basis of the operation data 51.

Here, it is assumed that the average value of the deviation $\Delta Q$ is 10, the unbiased estimate of population variance is 0.5, and the number of samples of the deviation $\Delta Q$ is 10. The value of t that achieves a confidence level of 99% is 3.250. Thus, the deviation $\Delta Q$ falls within the range of 10±1.625 at 99% confidence. The deviation $\Delta Q$ is out of the range of 10±1.625 with a probability of 1%. When a predicted load that can occur at a predetermined time is defined as 100, the real load is predicted to fall within the range of 111.625 to 108.375. That is, the upper limit load is 111.625, and the lower limit load 53 is 108.375.

As described above, the extraction unit 63 outputs the lower limit load 53 as the value of a load having a high occurrence probability, in the load that can occur in the control period. By the lower limit load 53 being output, the lower limit load 53 and the fluctuating load 72 that occurs over the lower limit load 53 and that fluctuates depending on time are separated from each other as shown in FIG. 7. The lower limit load 53 changes depending on sampling in a time period in which control is to be performed. The load to be processed by the air-conditioning system 1 depends on weather conditions such as the outdoor temperature and the amount of solar radiation. Thus, the load to be processed by the air-conditioning system 1 changes depending on a time period in a day. For example, in the case where cooling operation is performed, when the conditions other than a time period are the same, the load to be processed decreases in a time period in morning in which the outdoor temperature is relatively high and the amount of solar radiation is small.

Meanwhile, in a time period during the daytime in which the outdoor temperature is relatively high and the amount of solar radiation is large, the load to be processed increases. Thus, when the time period in which control is to be performed is divided by long time such as 24 hours, the lower limit load 53 is calculated with, as a reference, the load to be processed which is relatively low in morning. Therefore, the lower limit load 53 is low over 24 hours. On the other hand, when the time period in which control is to be performed is divided by short time such as 10 minutes, the lower limit load 53 is calculated with, as a reference, the load to be processed in each time period. Therefore, the lower limit load 53 increases in the time period in which the load to be processed is high, and the lower limit load 53 decreases in the time period in which the load to be processed is low. The extraction unit 63 may be included in a personal computer, a server, or another device that is capable of communicating with the controller 6. In addition, by, for example, a predicted load, the lower limit load 53, and an error being calculated, it is possible to perform control with high accuracy. However, in the case where the fluctuation pattern of the load in one day is substantially determined, the predetermined fluctuation pattern of the load may be stored in the storage unit 5.

(Distribution Unit 64)

The distribution unit 64 distributes a proportion at which the lower limit load 53 extracted by the extraction unit 63 is to be processed, as the processing proportion 55 stored in the storage unit 5. Specifically, the distribution unit 64 distributes the load to be processed by the air-conditioning apparatus 2, on the basis of the processing proportion 55, the apparatus rankings 54, and the lower limit load 53. The distribution unit 64 includes a calculation device that calculates a load to be assigned to each air-conditioning apparatus 2, on the basis of, for example, the processing proportion 55, the apparatus rankings 54, and the lower limit load 53. Regarding the first air-conditioning apparatus 3, which is a direct expansion type air-conditioning apparatus, and the second air-conditioning apparatus 4, which is a floor cooling and heating apparatus, the first air-conditioning apparatus 3 is at the first place, and the second air-conditioning apparatus 4 is at the second place in the apparatus rankings 54 as described above. Here, when the processing proportion 55 for the second air-conditioning apparatus 4 is 70%, the processing proportion 55 for the first air-conditioning apparatus 3 is 30%. When the lower limit load 53 is 100 kW, the distribution unit 64 assigns 70 kW to the second air-conditioning apparatus 4.

First Distribution Example

Figure 11:
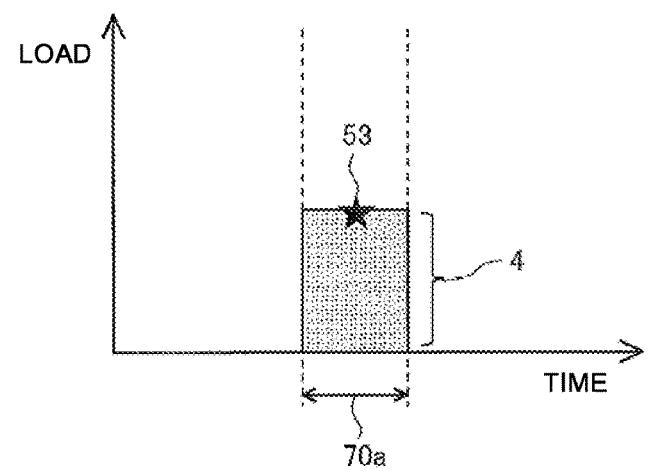
FIG. 11 is a graph showing a first distribution example of a processing proportion 55 in Embodiment 1 of the present invention.
Figure 12:
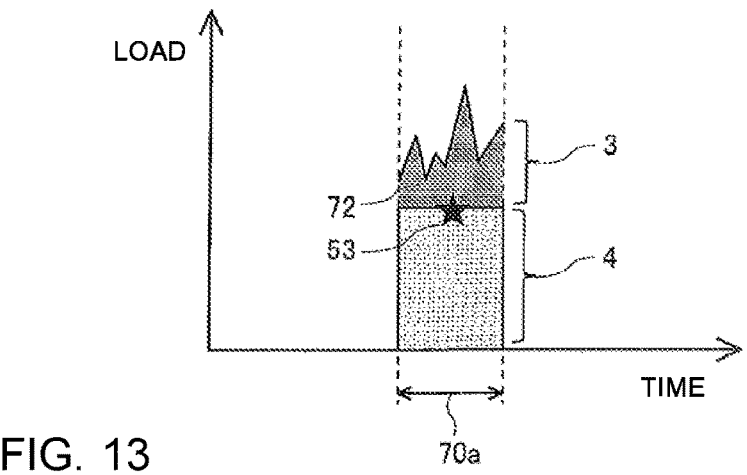
FIG. 12 is a graph showing the first distribution example of the processing proportion 55 in Embodiment 1 of the present invention.

FIGS. 11 and 12 are each a graph showing a first distribution example of the processing proportion 55 in Embodiment 1 of the present invention. The first distribution example illustrates the case where the processing proportion 55 for the second air-conditioning apparatus 4, which is at the second place in the apparatus rankings 54, is 100%. Since the processing proportion 55 for the second air-conditioning apparatus 4 is 100% as shown in FIG. 11, the distribution unit 64 assigns the entire lower limit load 53 to the second air-conditioning apparatus 4. Then, as shown in FIG. 12, the distribution unit 64 assigns the fluctuating load 72 to the first air-conditioning apparatus 3. Here, during real control, the amount of heat equivalent to the lower limit load 53 is continuously processed by the second air-conditioning apparatus 4. Since the amount of heat to be processed is the lower limit load 53 in the target time period in which control is to be performed, the second air-conditioning apparatus 4 does not excessively process the load. Then, the fluctuating load 72, which is not processed by the second air-conditioning apparatus 4, is processed by the first air-conditioning apparatus 3 having better controllability than the second air-conditioning apparatus 4. Accordingly, the whole load 71 is processed without excess and deficiency, and the temperature of the air in the air-conditioned space 10a is maintained at the set temperature.

Second Distribution Example

Figure 13:
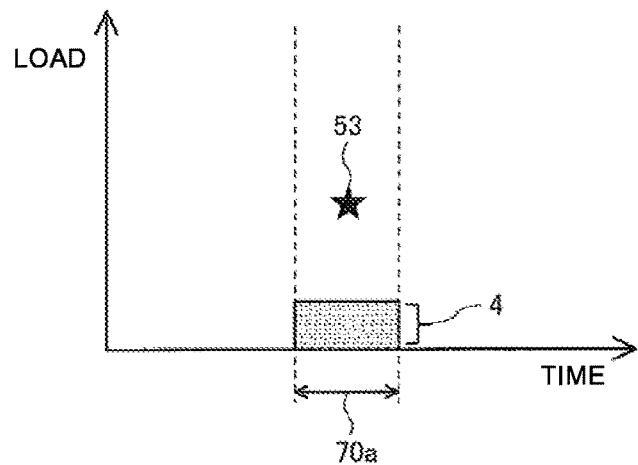
FIG. 13 is a graph showing a second distribution example of the processing proportion 55 in Embodiment 1 of the present invention.
Figure 14:
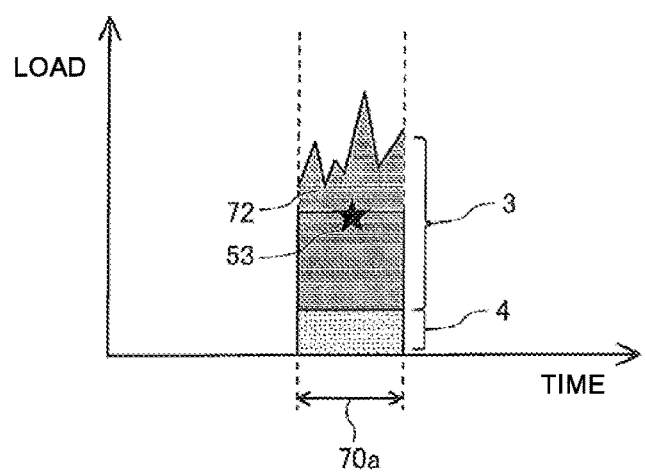
FIG. 14 is a graph showing the second distribution example of the processing proportion 55 in Embodiment 1 of the present invention.

FIGS. 13 and 14 are each a graph showing a second distribution example of the processing proportion 55 in Embodiment 1 of the present invention. The second distribution example illustrates the case where the processing proportion 55 for the second air-conditioning apparatus 4, which is at the second place in the apparatus rankings 54, is 20%. Since the processing proportion 55 for the second air-conditioning apparatus 4 is 20% as shown in FIG. 13, the distribution unit 64 assigns 20% of the lower limit load 53 to the second air-conditioning apparatus 4. Since the processing proportion 55 for the second air-conditioning apparatus 4 is 20%, the processing proportion 55 for the first air-conditioning apparatus 3 is 80%. As shown in FIG. 14, the distribution unit 64 assigns 80% of the lower limit load 53 and the fluctuating load 72 to the first air-conditioning apparatus 3. Accordingly, the whole load 71 is processed without excess and deficiency, and the temperature of the air in the air-conditioned space 10a is maintained at the set temperature.

Third Distribution Example

Figure 15:
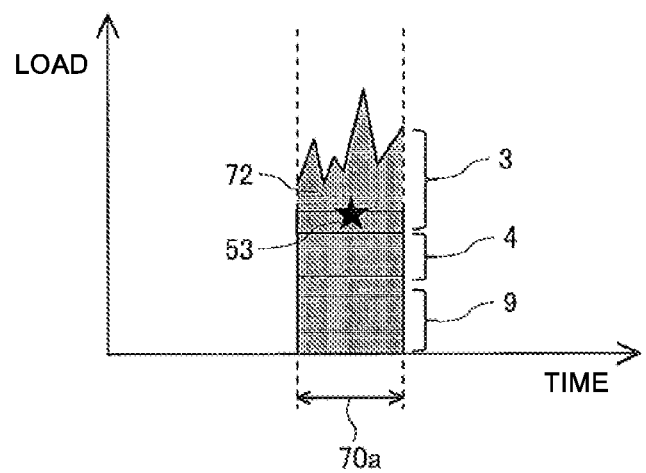
FIG. 15 is a graph showing a third distribution example of the processing proportion 55 in Embodiment 1 of the present invention.

FIG. 15 is a graph showing a third distribution example of the processing proportion 55 in Embodiment 1 of the present invention. The third distribution example illustrates the case where a third air-conditioning apparatus 9 that is at the third place in the apparatus rankings 54 is provided, the processing proportion 55 for the second air-conditioning apparatus 4, which is at the second place in the apparatus rankings 54, is 30%, and the third air-conditioning apparatus 9, which is at the third place in the apparatus rankings 54, is 50%. As shown in FIG. 15, the distribution unit 64 assigns 30% of the lower limit load 53 to the second air-conditioning apparatus 4 and assigns 50% of the lower limit load 53 to the third air-conditioning apparatus 9. Since the processing proportion 55 for the second air-conditioning apparatus 4 is 30% and the processing proportion 55 for the third air-conditioning apparatus 9 is 50%, the processing proportion 55 for the first air-conditioning apparatus 3 is 20%. Then, the distribution unit 64 assigns 20% of the lower limit load 53 and the fluctuating load 72 to the first air-conditioning apparatus 3. Accordingly, the whole load 71 is processed without excess and deficiency, and the temperature of the air in the air-conditioned space 10a is maintained at the set temperature.

As described above, the first air-conditioning apparatus 3, to which the processing proportion 55 is not provided and which is at the first place in the apparatus rankings 54, processes the fluctuating load 72 and the rest of the lower limit load 53 that is not processed by the air-conditioning apparatuses 2 that are at the second place and subsequent places in the apparatus rankings 54. The first air-conditioning apparatus 3 having good controllability processes the load according to own control such that the set temperature is satisfied. In Embodiment 1, the processing proportion 55 for the air-conditioning apparatus 2 that is at the first place in the apparatus rankings 54 may not be stored. This is because, if the processing proportion 55 for the air-conditioning apparatus 2 that is at the first place in the apparatus rankings 54 is set to 100%, the processing proportions 55 for the air-conditioning apparatuses 2 that are at the second place and subsequent places in the apparatus rankings 54 are 0% and thus the air-conditioning apparatuses 2 stop. Therefore, only the processing proportions 55 for the air-conditioning apparatuses 2 that are at the second place and subsequent places in the apparatus rankings 54 may be stored. Since the total proportion is 100%, the processing proportion 55 for the air-conditioning apparatus 2 that is at the first place in the apparatus rankings 54 is obtained by subtracting the processing proportions 55 for the air-conditioning apparatuses 2 that are at the second place and subsequent places in the apparatus rankings 54, from 100%.

(Air-Conditioning Control Unit 65)

The air-conditioning control unit 65 controls each of the air-conditioning apparatuses 2 that are at the second place and subsequent places in the apparatus rankings 54, such that the lower limit load 53 is processed at the processing proportion 55 distributed by the distribution unit 64, and controls the air-conditioning apparatus 2 that is at the first place in the apparatus rankings 54, such that the remaining load of the lower limit load 53 and the fluctuating load 72 occurring over the lower limit load 53 are processed.

(Operation Modes of First Air-Conditioning Apparatus 3)

Next, operation modes of the first air-conditioning apparatus 3 will be described. The first air-conditioning apparatus 3 has cooling operation and heating operation as the operation modes. In the cooling operation, the refrigerant flows in order of the first compressor 31, the first flow path switching unit 32, the first outdoor heat exchanger 33, the first expansion unit 34, and the indoor heat exchanger 35, and the indoor space is caused to exchange heat with the refrigerant in the indoor heat exchanger 35, so that the indoor space is cooled. In the heating operation, the refrigerant flows in order of the first compressor 31, the first flow path switching unit 32, the indoor heat exchanger 35, the first expansion unit 34, and the first outdoor heat exchanger 33, and the indoor space is caused to exchange heat with the refrigerant in the indoor heat exchanger 35, so that the indoor space is heated. The first air-conditioning apparatus 3 operates such that the indoor temperature is maintained at the set temperature on the basis of the contents set by the user via the controller 6.

(Cooling Operation of First Air-Conditioning Apparatus 3)

Next, operation of each operation mode of the first air-conditioning apparatus 3 will be described. First, the cooling operation will be described. In the cooling operation, the refrigerant sucked into the first compressor 31 is compressed by the first compressor 31 and discharged in a high-temperature and high-pressure gas state. The refrigerant discharged from the first compressor 31 in a high-temperature and high-pressure gas state flows through the first flow path switching unit 32 into the first outdoor heat exchanger 33 and is caused to exchange heat with outdoor air to condense and liquify in the first outdoor heat exchanger 33. The condensed refrigerant in a liquid state flows into the first expansion unit 34 and is expanded and reduced in pressure into a two-phase gas-liquid state in the first expansion unit 34. Then, the refrigerant in a two-phase gas-liquid state flows into the indoor heat exchanger 35 and is caused to exchange heat with the indoor air to evaporate and gasify in the indoor heat exchanger 35. At this time, the indoor air in the air-conditioned space 10a is cooled and cooling is performed. The evaporated refrigerant in a gas state flows through the first flow path switching unit 32 and is sucked into the first compressor 31.

(Heating Operation of First Air-Conditioning Apparatus 3)

Next, the heating operation will be described. In the heating operation, the refrigerant sucked into the first compressor 31 is compressed by the first compressor 31 and discharged in a high-temperature and high-pressure gas state. The refrigerant discharged from the first compressor 31 in a high-temperature and high-pressure gas state flows through the first flow path switching unit 32 into the indoor heat exchanger 35 and is caused to exchange heat with the indoor air to condense and liquify in the indoor heat exchanger 35. At this time, the indoor air in the air-conditioned space 10a is heated and heating is performed. The condensed refrigerant in a liquid state flows into the first expansion unit 34 and is expanded and reduced in pressure into a two-phase gas-liquid state in the first expansion unit 34. Then, the refrigerant in a two-phase gas-liquid state flows into the first outdoor heat exchanger 33 and is caused to exchange heat with the outdoor air to evaporate and gasify in the first outdoor heat exchanger 33. The evaporated refrigerant in a gas state flows through the first flow path switching unit 32 and is sucked into the first compressor 31.

(Operation Modes of Second Air-Conditioning Apparatus 4)

Next, operation modes of the second air-conditioning apparatus 4 will be described. The second air-conditioning apparatus 4 has cooling operation and heating operation as the operation modes. In the cooling operation, the refrigerant flows in order of the second compressor 41, the second flow path switching unit 42, the second outdoor heat exchanger 43, the second expansion unit 44, and the water-refrigerant heat exchanger 45 in the second refrigerant circuit 40, water flows in order of the pump 47, the water-refrigerant heat exchanger 45, and the underfloor heat exchanger 48 in the water circuit 46, and the indoor air is caused to exchange heat with the water to be cooled in the underfloor heat exchanger 48. In the heating operation, the refrigerant flows in order of the second compressor 41, the second flow path switching unit 42, the water-refrigerant heat exchanger 45, the second expansion unit 44, and the second outdoor heat exchanger 43 in the second refrigerant circuit 40, water flows in order of the pump 47, the water-refrigerant heat exchanger 45, and the underfloor heat exchanger 48 in the water circuit 46, and the indoor air is caused to exchange heat with the water to be heated in the underfloor heat exchanger 48. The second air-conditioning apparatus 4 operates such that the indoor temperature is maintained at the set temperature on the basis of the contents set by the user via the controller 6.

(Cooling Operation of Second Air-Conditioning Apparatus 4)

Next, operation of each operation mode of the second air-conditioning apparatus 4 will be described. First, the cooling operation will be described. In the cooling operation, in the second refrigerant circuit 40, the refrigerant sucked into the second compressor 41 is compressed by the second compressor 41 and discharged in a high-temperature and high-pressure gas state. The refrigerant discharged from the second compressor 41 in a high-temperature and high-pressure gas state flows through the second flow path switching unit 42 into the second outdoor heat exchanger 43 and is caused to exchange heat with the outdoor air to condense and liquify in the second outdoor heat exchanger 43. The condensed refrigerant in a liquid state flows into the second expansion unit 44 and is expanded and reduced in pressure into a two-phase gas-liquid state in the second expansion unit 44. Then, the refrigerant in a two-phase gas-liquid state flows into the water-refrigerant heat exchanger 45 and is caused to exchange heat with the water to evaporate and gasify in the water-refrigerant heat exchanger 45. At this time, the water in the water circuit 46 is cooled. The evaporated refrigerant in a gas state flows through the first flow path switching unit 32 and is sucked into the first compressor 31.

In the water circuit 46, the water discharged from the pump 47 flows into the water-refrigerant heat exchanger 45 and is caused to exchange heat with the refrigerant to be cooled in the water-refrigerant heat exchanger 45. The cooled water flows into the underfloor heat exchanger 48 and is caused to exchange heat with the indoor air to be heated in the underfloor heat exchanger 48. At this time, the indoor air in the air-conditioned space 10a is cooled and cooling is performed. The heated water is sucked into the pump 47.

(Heating Operation of Second Air-Conditioning Apparatus 4)

Next, the heating operation will be described. In the heating operation, in the second refrigerant circuit 40, the refrigerant sucked into the second compressor 41 is compressed by the second compressor 41 and discharged in a high-temperature and high-pressure gas state. The refrigerant discharged from the second compressor 41 in a high-temperature and high-pressure gas state flows through the second flow path switching unit 42 into the water-refrigerant heat exchanger 45 and is caused to exchange heat with the water to condense and liquify in the water-refrigerant heat exchanger 45. At this time, the water in the water circuit 46 is heated. The condensed refrigerant in a liquid state flows into the second expansion unit 44 and is expanded and reduced in pressure into a two-phase gas-liquid state in the second expansion unit 44. Then, the refrigerant in a two-phase gas-liquid state flows into the second outdoor heat exchanger 43 and is caused to exchange heat with outdoor air to evaporate and gasify in the second outdoor heat exchanger 43. The evaporated refrigerant in a gas state flows through the second flow path switching unit 42 and is sucked into the second compressor 41.

In the water circuit 46, the water discharged from the pump 47 flows into the water-refrigerant heat exchanger 45 and is caused to exchange heat with the refrigerant to be heated in the water-refrigerant heat exchanger 45. The heated water flows into the underfloor heat exchanger 48 and is caused to exchange heat with the indoor air to be cooled in the underfloor heat exchanger 48. At this time, the indoor air in the air-conditioned space 10a is heated and heating is performed. The cooled water is sucked into the pump 47.

(Pre-Operation of Air-Conditioning System 1)

Figure 16:
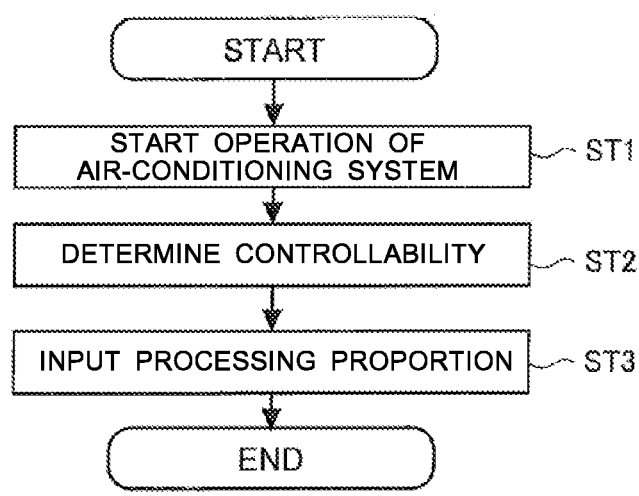
FIG. 16 is a flowchart showing operation of the air-conditioning system 1 according to Embodiment 1 of the present invention.

FIG. 16 is a flowchart showing operation of the air-conditioning system 1 according to Embodiment 1 of the present invention. Next, operation of the air-conditioning system 1 according to Embodiment 1 of the present invention will be described. First, pre-operation before real control of the air-conditioning system 1 is performed will be described. As shown in FIG. 16, when the air-conditioning system 1 starts to operate (step ST1), the operation data 51 is stored in the storage unit 5. Then, the catalog 52 is referred to, and the controllability of each air-conditioning apparatus 2 is determined (step ST2). Next, the user inputs the processing proportion 55 reflecting intention of the user by using the input unit 62 (step ST3). In Embodiment 1, the processing proportion 55 for the air-conditioning apparatus 2 that is at the first place in the apparatus rankings 54 is also input.

Figure 17:
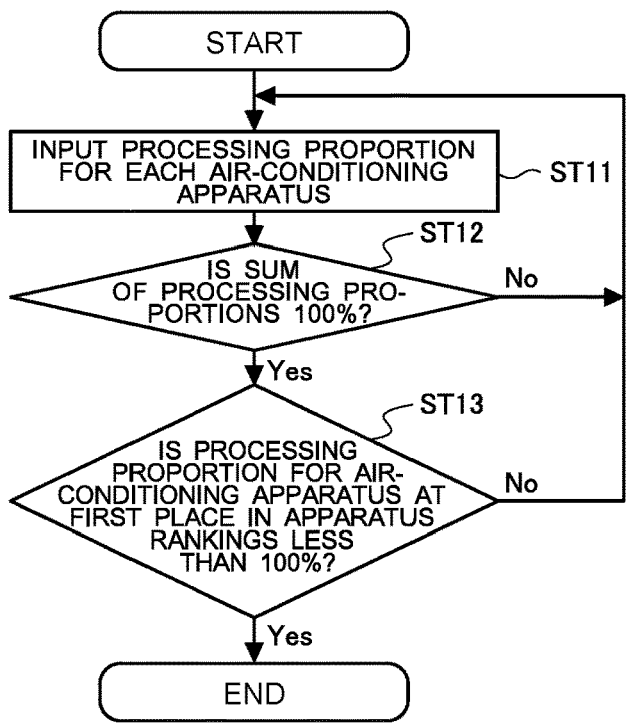
FIG. 17 is a flowchart showing operation of the air-conditioning system 1 according to Embodiment 1 of the present invention.

FIG. 17 is a flowchart showing operation of the air-conditioning system 1 according to Embodiment 1 of the present invention. In step ST3, when the processing proportion 55 for each air-conditioning apparatus 2 is input (step ST11), whether the sum of the processing proportions 55 for the respective air-conditioning apparatuses 2 is 100% is determined (step ST12). When the sum of the processing proportions 55 for the respective air-conditioning apparatuses 2 is not 100% (No in step ST12), the operation returns to step ST11. On the other hand, when the sum of the processing proportions 55 for the respective air-conditioning apparatuses 2 is 100% (Yes in step ST12), whether the processing proportion 55 for the air-conditioning apparatus 2 that is at the first place in the apparatus rankings 54 is less than 100% is determined (step ST13). When the processing proportion 55 for the air-conditioning apparatus 2 that is at the first place in the apparatus rankings 54 is 100% (No in step ST13), the operation returns to step ST11. On the other hand, when the processing proportion 55 for the air-conditioning apparatus 2 that is at the first place in the apparatus rankings 54 is less than 100% (Yes in step ST13), the pre-operation ends. Since the apparatus rankings 54 is required in input with the input unit 62, input with the input unit 62 is performed after the controllability of each air-conditioning apparatus 2 is determined.

(Control Operation of Air-Conditioning System 1)

Figure 18:
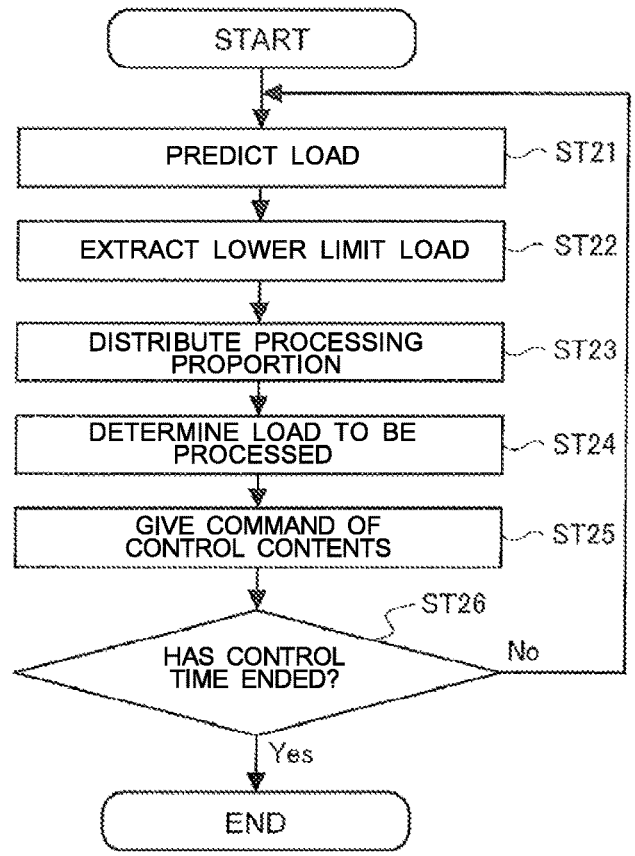
FIG. 18 is a flowchart showing operation of the air-conditioning system 1 according to Embodiment 1 of the present invention.

FIG. 18 is a flowchart showing operation of the air-conditioning system 1 according to Embodiment 1 of the present invention. Next, real control of the air-conditioning system 1 will be described. First, a load is predicted by the load prediction unit 63a (step ST21). Next, the lower limit load 53 is extracted by the error calculation unit 63b (step ST22). Then, the proportion at which the lower limit load 53 is to be processed is distributed by the distribution unit 64 as the processing proportion 55 stored in the storage unit 5 (step ST23). Accordingly, the load to be processed by each air-conditioning apparatus 2 is determined (step ST24). Thereafter, a command of control contents is given to each air-conditioning apparatus 2 by the air-conditioning control unit 65 (step ST25). Here, whether a control time has ended is determined (step ST26). When the control time is remaining (No in step ST26), the operation returns to step ST21. When the control time has ended (Yes in step ST26), the control ends.

According to Embodiment 1, the proportion at which the lower limit load 53 extracted by the extraction unit 63 is to be processed is distributed as the processing proportion 55 stored in the storage unit 5. Here, the user of the air-conditioned space 10a is allowed to store a desired processing proportion 55 in the storage unit 5 in advance. Therefore, a comfortable air-conditioning system 1 in which intention of the user of the air-conditioned space 10a is reflected is realized.

Hitherto, an air-conditioning system has been known in which an operation plan that minimizes or maximizes an objective function is created on the basis of mathematical programming. In this air-conditioning system, operation of each air-conditioning apparatus depends on a method for determining the objective function, and thus intention of a user of an air-conditioned space is not reflected. For example, in the air-conditioned space in which a direct expansion type air-conditioning apparatus and a floor cooling and heating apparatus are installed, the floor cooling and heating apparatus may mainly operate, or the direct expansion type air-conditioning apparatus may mainly operate. However, it is difficult for the user of the air-conditioned space to set an objective function such that desired operation is achieved. In addition, when operation is performed such that a deviation from a plan that occurs in the day of operation is corrected, the plan correction is desired to follow real control in real time. Thus, the calculation load on a controller increases as the cycle in which the plan is corrected is shorter.

On the other hand, in Embodiment 1, the fluctuating load 72 occurring over the lower limit load 53 is processed by the air-conditioning apparatus 2 that is at the first place in the apparatus rankings 54, and thus plan correction is unnecessary. Therefore, an increase in the calculation load on the controller 6 is reduced. Accordingly, the life of the air-conditioning system 1 is extended.

In addition, the apparatus rankings 54 stored in the storage unit 5 are created in the order of a shorter time taken to reach the set temperature. The controllability of the air-conditioning apparatus 2 is better as the time taken to reach the set temperature is shorter. Thus, the time taken to reach the set temperature is an index for how good the controllability is. Furthermore, the apparatus rankings 54 stored in the storage unit 5 are created with reference to the catalog 52 indicating the characteristics of each air-conditioning apparatus 2. The accuracy of the apparatus rankings 54 is high since reference is made to the catalog 52 indicating the characteristics of the air-conditioning apparatuses 2. Moreover, the input unit 62 for inputting the processing proportion 55 of the load to be processed by each of the air-conditioning apparatuses 2 that are at the second place and subsequent places in the apparatus rankings 54 is further provided, and the controller 6 has a function to store the processing proportion 55 input with the input unit 62, in the storage unit 5. As described above, since the air-conditioning system 1 includes the input unit 62, it is possible to further reflect intention of the user.

The extraction unit 63 has the error calculation unit 63b that calculates a lower limit of errors occurring in a load that occurs in the air-conditioned space 10a, and calculates the lower limit load 53. Accordingly, it is possible to calculate the lower limit load 53. In addition, the extraction unit 63 further has the load prediction unit 63a that predicts a load that will occur in the air-conditioned space 10a, on the basis of: the operation data 51 indicating the operation status of each air-conditioning apparatus 2; and an air-conditioning situation that can occur in a control period. Accordingly, it is possible to predict a load that can occur in the control period.

Embodiment 2

Figure 19:
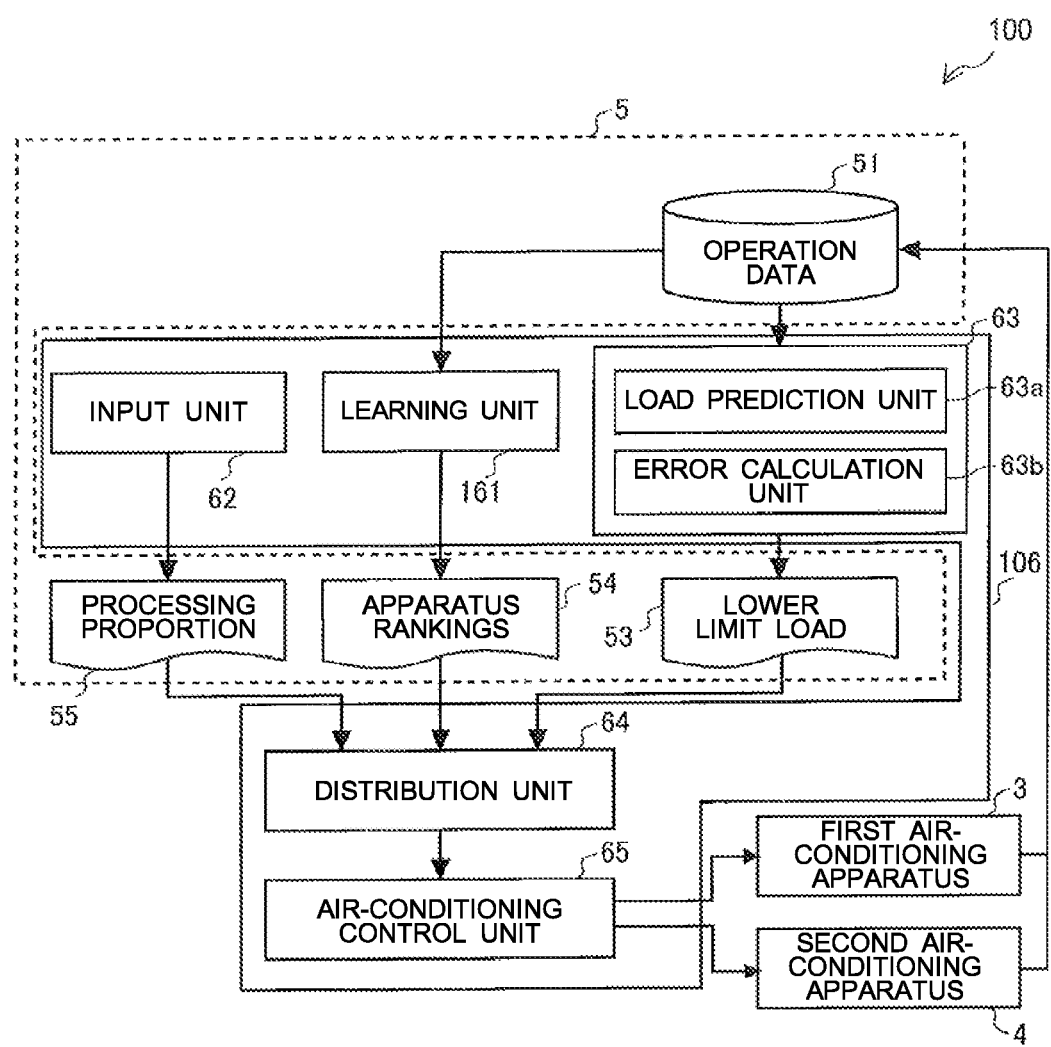
FIG. 19 is a block diagram showing a controller 106 in Embodiment 2 of the present invention.

FIG. 19 is a block diagram showing a controller 106 in Embodiment 2 of the present invention. Embodiment 2 is different from Embodiment 1 in that, in an air-conditioning system 100, the controller 106 includes a learning unit 161 instead of the determination unit 61. In Embodiment 2, parts common to Embodiment 1 are designated by the same reference signs and the description thereof is omitted, and the differences from Embodiment 1 will be mainly described.

As shown in FIG. 19, the learning unit 161 refers to the operation data 51, learns how good the controllability of the corresponding air-conditioning apparatus 2 is, and creates the apparatus rankings 54. For example, the learning unit 161 learns a model obtained by calculating how the indoor temperature in the air-conditioned space 10a fluctuates with respect to the contents input with the input unit 62, by referring to the operation data 51. Then, the learning unit 161 learns the controllability of each air-conditioning apparatus 2 by using the calculated model. Specifically, the building 10 is represented by a thermal network model, and a parameter at each portion is determined so as to match a room temperature obtained from the operation data 51 or an amount of heat supplied by the air-conditioning apparatus 2. By using this mode, how the indoor temperature in the air-conditioned space 10a fluctuates with respect to the amount of heat supplied by the air-conditioning apparatus 2 is calculated.

In addition, the learning unit 161 may learn a neural network outputting an indoor temperature, with respect to the contents input with the input unit 62. When a calculated model is used, the learning unit 161 may learn the controllability of each air-conditioning apparatus 2 by measurement of a time taken to reach the set temperature again to achieve stability after the set temperature is changed, or by measurement of a time taken for the indoor temperature to reach the set temperature again to achieve stability when the load is changed. At this time, in the apparatus rankings 54, the place is higher in the order of a shorter measured time. In addition, for example, when trial operation of the air-conditioning system 100 is possible, the learning unit 161 may learn the controllability of each air-conditioning apparatus 2 by measurement of a time taken to reach the set temperature again when the set temperature is changed stepwise after each air-conditioning apparatus 2 singly operates and the indoor temperature reaches the set temperature to bring about a stationary state. At this time, in the apparatus rankings 54, the place is higher in the order of a shorter measured time.

According to Embodiment 2, the apparatus rankings 54 stored in the storage unit 5 are created with reference to the operation data 51 indicating the operation status of each air-conditioning apparatus 2. Accordingly, the catalog 52 becomes unnecessary, and thus the configuration is simplified, and the calculation load on the controller 106 during real control is reduced.

Embodiment 3

Figure 20:
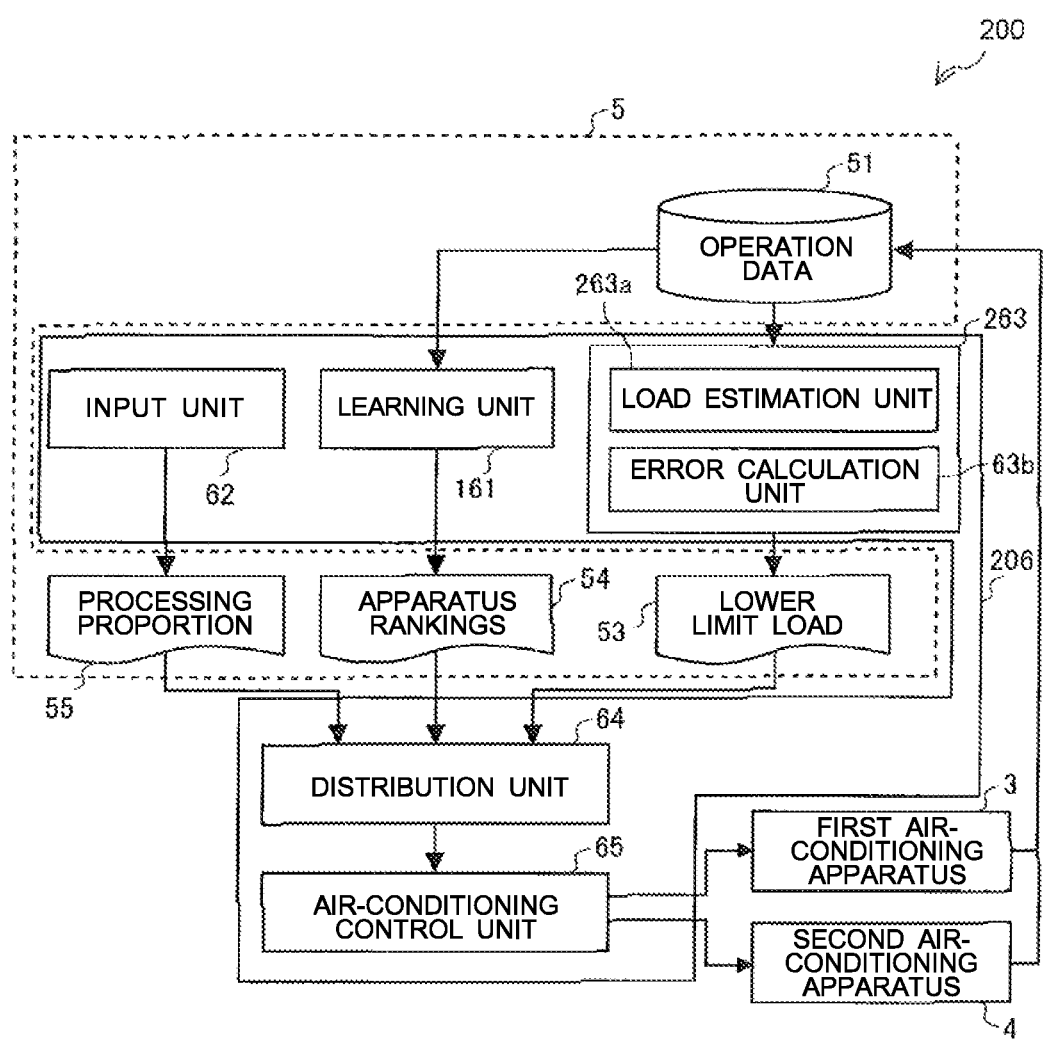
FIG. 20 is a block diagram showing a controller 206 in Embodiment 3 of the present invention.

FIG. 20 is a block diagram showing a controller 206 in Embodiment 3 of the present invention. Embodiment 3 is different from Embodiment 2 in that, in an air-conditioning system 200, an extraction unit 263 includes a load estimation unit 263a instead of the load prediction unit 63a. In Embodiment 3, parts common to Embodiments 1 and 2 are designated by the same reference signs and the description thereof is omitted, and the differences from Embodiments 1 and 2 will be mainly described.

As shown in FIG. 20, the load estimation unit 263a estimates a load that will occur in the air-conditioned space 10a, on the basis of the present operation status of each air-conditioning apparatus 2. That is, in Embodiment 3, a load during a predetermined period in the future, for example, a load during 30 minutes, is estimated as a load equal to the present load. Then, the error calculation unit 63b calculates the lower limit load 53 of the load estimated by the load estimation unit 263a. In this case, the error calculation unit 63b calculates how much the present load fluctuates during a predetermined period in the future, and calculates the lower limit load 53 on the basis of an error from the present load.

According to Embodiment 3, the extraction unit 263 has the load estimation unit 263a that estimates a load that will occur in the air-conditioned space 10a, on the basis of the present operation status of each air-conditioning apparatus 2. Accordingly, information about an air-conditioning situation that can occur in a control period is unnecessary, and thus the configuration is simplified, and the calculation load on the controller 206 during real control is reduced.

Embodiment 4

Figure 21:
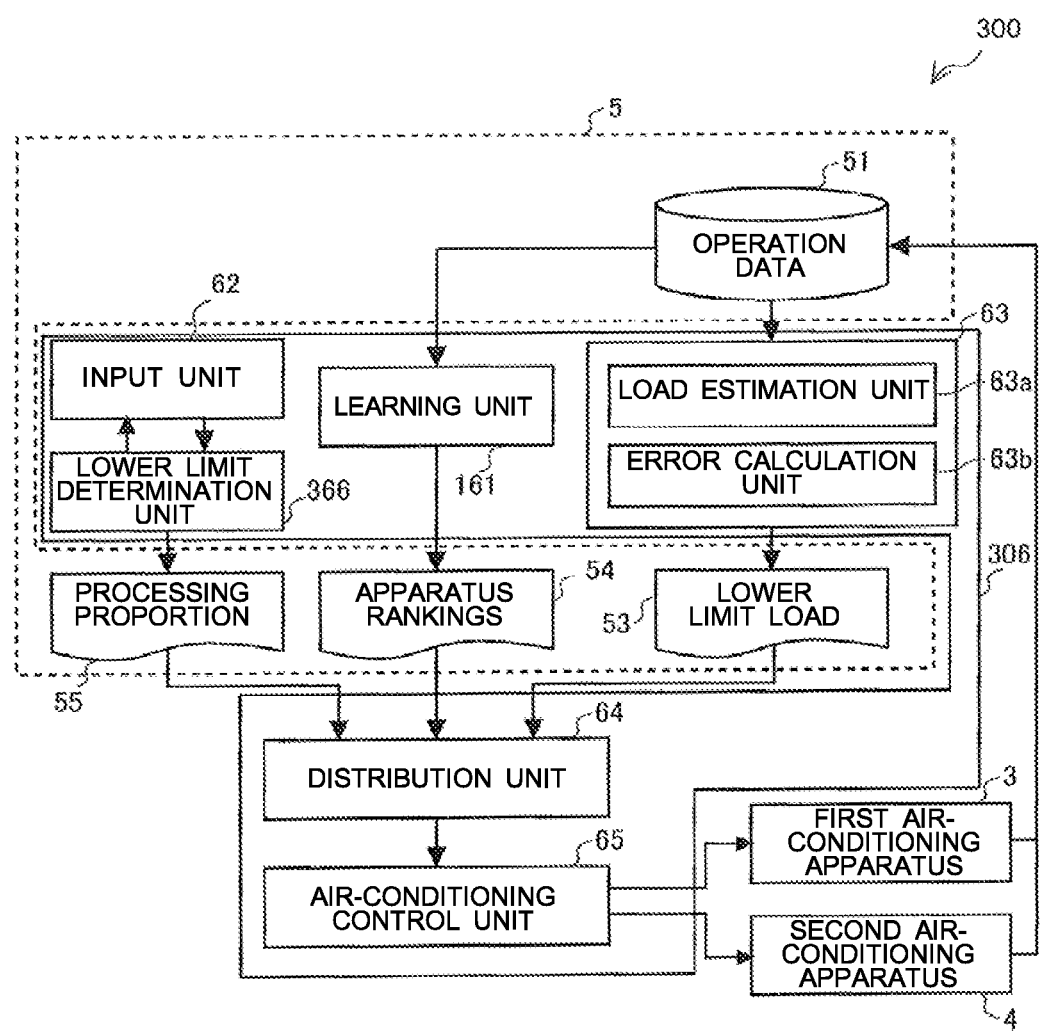
FIG. 21 is a block diagram showing a controller 306 in Embodiment 4 of the present invention.

FIG. 21 is a block diagram showing a controller 306 in Embodiment 4 of the present invention. Embodiment 4 is different from Embodiment 2 in that, in an air-conditioning system 300, the controller 306 includes a lower limit determination unit 366. In Embodiment 4, parts common to Embodiments 1, 2, and 3 are designated by the same reference signs and the description thereof is omitted, and the differences from Embodiments 1, 2, and 3 will be mainly described.

As shown in FIG. 21, the lower limit determination unit 366 requests re-input to the input unit 62 when the processing proportion 55 input with the input unit 62 is less than a proportion lower limit threshold on the basis of design information of the air-conditioning system 300. At this time, the lower limit determination unit 366 promotes input of a value equal to or greater than the proportion lower limit threshold. For example, in the air-conditioning system 1, when the value of load is tough and a capacity shortage is recognized in advance to occur unless the corresponding air-conditioning apparatus 2 bears 30% of the load, the proportion lower limit threshold is set to 30%. Accordingly, the processing proportion 55 for the corresponding air-conditioning apparatus 2 is prevented from being less than 30%. As a result, it is possible to inhibit non-cooling/non-heating due to a capacity shortage.

According to Embodiment 4, the controller 306 has a function to request re-input to the input unit 62 when the processing proportion 55 input with the input unit 62 is less than the proportion lower limit threshold. Accordingly, it is possible to inhibit non-cooling/non-heating due to a capacity shortage.

REFERENCE SIGNS LIST

1 air-conditioning system 2 air-conditioning apparatus 3 first air-conditioning apparatus 3a first outdoor unit 3b indoor unit 4 second air-conditioning apparatus 4a second outdoor unit 5 storage unit 6 controller 7 transmission line 8 internet 9 third air-conditioning apparatus 10 building 10a air-conditioned space 11 roof floor 12 ceiling 13 wall 14 floor 15 lighting 16 window 30 first refrigerant circuit 30a first refrigerant pipe 31 first compressor 32 first flow path switching unit 33 first outdoor heat exchanger 34 first expansion unit 35 indoor heat exchanger 40 second refrigerant circuit 40a second refrigerant pipe 41 second compressor 42 second flow path switching unit 43 second outdoor heat exchanger 44 second expansion unit 45 water-refrigerant heat exchanger 46 water circuit 46a water pipe 47 pump 48 underfloor heat exchanger 51 operation data 52 catalog 53 lower limit load 53a error bar 54 apparatus rankings 54a name 55 processing proportion 61 determination unit 62 input unit 63 extraction unit 63a load prediction unit 63b error calculation unit 64 distribution unit 65 air-conditioning control unit 70 load 70a time period 71 whole load 72 fluctuating load 100 air-conditioning system 106 controller 161 learning unit 200 air-conditioning system 206 controller 263 extraction unit 263a load estimation unit 300 air-conditioning system 306 controller 366 lower limit determination unit

The invention claimed is:

1. An air-conditioning system, comprising:
a plurality of air-conditioning apparatuses configured to condition air in an air-conditioned space;
a memory to store (1) apparatus rankings created for the plurality of air-conditioning apparatuses in order of a shorter time taken to reach a set temperature, and (2) a processing proportion of a load to be processed by each of the air-conditioning apparatuses that are at a second place and subsequent places in the apparatus rankings; and
a controller including circuitry configured to control operation of the plurality of air-conditioning apparatuses, wherein the circuitry is configured to
extract a lower limit load that occurs at a minimum, in a load that occurs in the air-conditioned space and is handled by the plurality of air-conditioning apparatuses,
determine, for each apparatus of the air-conditioning apparatuses that are at the second place and the subsequent places in the apparatus ranking, a load to be processed by the apparatus, based on the extracted lower limit load and the stored processing proportion, and
control each of the air-conditioning apparatuses that are at the second place and subsequent places in the apparatus rankings, such that the lower limit load is processed using the determined loads, and control the air-conditioning apparatus that is at a first place in the apparatus rankings, such that a remaining load of the lower limit load and a fluctuating load, which occurs in excess of the lower limit load, are processed.

2. The air-conditioning system of claim 1, wherein the apparatus rankings stored in the memory are created with reference to a catalog indicating characteristics of each air-conditioning apparatus of the plurality of air-conditioning apparatuses.

3. The air-conditioning system of claim 1, wherein the apparatus rankings stored in the memory are created with reference to operation data indicating an operation status of each air-conditioning apparatus of the plurality of air-conditioning apparatuses.

4. The air-conditioning system of claim 1, further comprising an input unit configured to receive input of the processing proportion of the load to be processed by each of the air-conditioning apparatuses that are at the second place and subsequent places in the apparatus rankings, wherein
the circuitry is further configured to store, in the memory, the processing proportion received by the input unit.

5. The air-conditioning system of claim 4, wherein the circuitry is further configured to request re-input to the input unit, when a processing proportion received by the input unit is less than a proportion lower limit threshold.

6. The air-conditioning system of claim 1, wherein the circuitry is further configured to calculate a lower limit of an error occurring in a load that occurs in the air-conditioned space, and calculate the lower limit load.

7. The air-conditioning system of claim 1, wherein the circuitry is further configured to predict a load that will occur in the air-conditioned space, based on operation data indicating an operation status of each air-conditioning apparatus and an air-conditioning situation that can occur in a control period.

8. The air-conditioning system of claim 1, wherein the circuitry is further configured to estimate a load that will occur in the air-conditioned space, based on a present operation status of each air-conditioning apparatus.

9. The air-conditioning system of claim 1, wherein the memory stores the processing proportion as a percentage, for each of the air-conditioning apparatuses other than the apparatus, of the plurality of air-conditioning apparatuses, at the first place.

10. An air-conditioning method, comprising:
storing (1) apparatus rankings created for a plurality of air-conditioning apparatuses, configured to condition air in an air-conditioned space, in order of a shorter time taken to reach a set temperature, and (2) a processing proportion of a load to be processed by each of the air-conditioning apparatuses that are at a second place and subsequent places in the apparatus rankings;
extracting a lower limit load that occurs at a minimum, in a load that occurs in the air-conditioned space and is handled by the plurality of air-conditioning apparatuses;
determining, for each apparatus of the air-conditioning apparatuses that are at the second place and the subsequent places in the apparatus ranking, a load to be processed by the apparatus, based on the extracted lower limit load and the stored processing proportion;
controlling each of the air-conditioning apparatuses that are at the second place and subsequent places in the apparatus rankings, such that the lower limit load is processed using the determined loads; and
controlling the air-conditioning apparatus that is at a first place in the apparatus rankings, such that a remaining load of the lower limit load and a fluctuating load, which occurs in excess of the lower limit load, are processed.

* * * * *